(12) United States Patent
Jalet

(10) Patent No.: US 9,044,046 B2
(45) Date of Patent: Jun. 2, 2015

(54) COMBINED CITRUS PRESS AND ZESTER

(71) Applicant: Dart Industries Inc., Orlando, FL (US)

(72) Inventor: Vincent Jalet, Brussels (BE)

(73) Assignee: Dart Industries Inc., Orlando, FL (US)

( * ) Notice: Subject to any disclaimer, the term of this patent is extended or adjusted under 35 U.S.C. 154(b) by 364 days.

(21) Appl. No.: 13/768,025

(22) Filed: Feb. 15, 2013

(65) Prior Publication Data

US 2014/0231343 A1    Aug. 21, 2014

(51) Int. Cl.
| | |
|---|---|
| A47J 17/00 | (2006.01) |
| A23N 1/00 | (2006.01) |
| A47J 43/25 | (2006.01) |
| A47J 17/04 | (2006.01) |
| A47J 19/02 | (2006.01) |
| A47J 19/06 | (2006.01) |

(52) U.S. Cl.
CPC .............. *A23N 1/003* (2013.01); *A47J 43/255* (2013.01); *A47J 43/25* (2013.01); *A47J 17/04* (2013.01); *A47J 19/022* (2013.01); *A47J 19/06* (2013.01)

(58) Field of Classification Search
CPC .................................. A47J 43/25; A47J 43/255
USPC .................... 241/168, 169, 169.2, 95, 84.3
See application file for complete search history.

(56) References Cited

U.S. PATENT DOCUMENTS

| | | | |
|---|---|---|---|
| D307,090 S | 4/1990 | DeCoster | |
| 5,924,636 A * | 7/1999 | Calderon | 241/84.3 |
| D512,880 S | 12/2005 | de Groote | |
| 7,293,502 B2 * | 11/2007 | So | 100/234 |
| 7,296,762 B2 * | 11/2007 | Dorion | 241/169 |
| 7,648,092 B2 * | 1/2010 | Wong et al. | 241/169 |
| D610,880 S | 3/2010 | Pallotto | |
| D648,988 S | 11/2011 | Ablo | |
| D667,281 S | 9/2012 | Jalet | |
| 2006/0021519 A1 * | 2/2006 | Shen | 99/501 |

* cited by examiner

*Primary Examiner* — Faye Francis
(74) *Attorney, Agent, or Firm* — Taylor J. Ross

(57) ABSTRACT

A combined citrus press and zester. The citrus press is of a known type, and includes an upper handle and a lower handle joined at a forward pivot point. The lower handle includes a cup sized to receive a halved citrus fruit, such as a lemon or lime. The upper handle includes a male die which mates with said cup to compress and thus juice the halved fruit. To save material and weight, the male die is formed as relatively constant thickness, which results in a depression on the opposite, outer side of the upper handle. The citrus zester includes a body with a grating blade received or formed therein. The inner side of the body has a collar extending therefrom and surrounding the blade. This collar is sized to be received within the depression formed in the upper handle of the citrus press. The collar may be sized and formed such that the zester may be selectively mounted to the press.

6 Claims, 3 Drawing Sheets

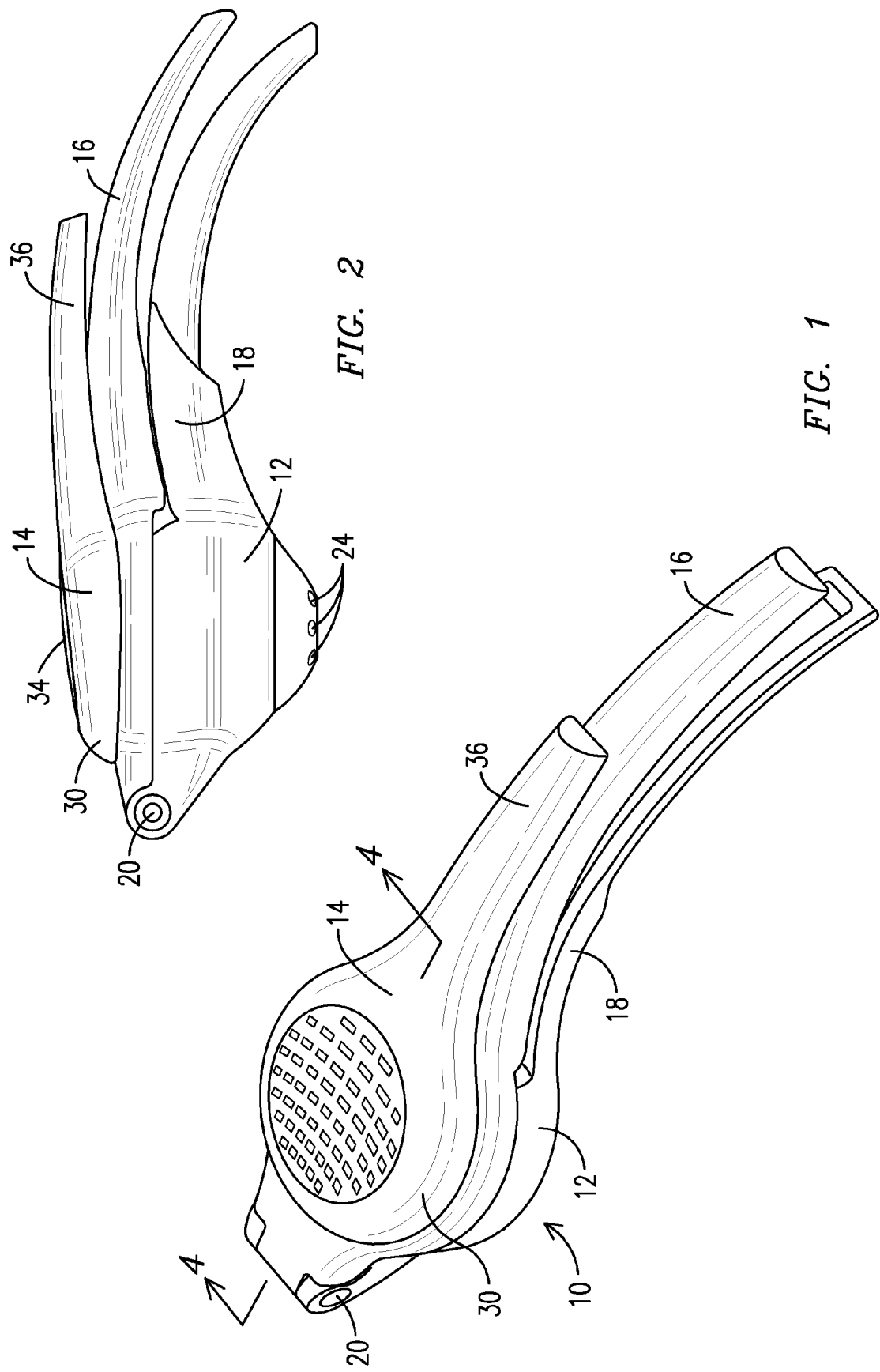

COMBINED CITRUS PRESS AND ZESTER

CROSS REFERENCE TO RELATED APPLICATIONS

This application is related to copending design application No. 29/445,725, filed on even date herewith.

STATEMENT REGARDING FEDERALLY SPONSORED RESEARCH

Not applicable.

BACKGROUND OF THE INVENTION

The present invention relates in general to kitchen or cooking implements. In particular, the present invention relates to an improved citrus zester which may be combined with a standard citrus press.

During cooking it is common to use freshly squeezed citrus juice, as well as freshly grated peel from citrus fruits. Manual presses for citrus juice are well known, as are manual graters (or "zesters") for citrus peel (or "zest"). These two implements have been separate items, despite their related use.

SUMMARY OF THE INVENTION

An object of the present invention is to provide a citrus zester which may be combined with a citrus press.

A further object is to provide such a combined citrus press and zester where the zester is selectively retained upon the press.

These and other objects are achieved by a combined citrus press and zester. The citrus press is of a known type, and includes an upper handle and a lower handle joined at a forward pivot point. The lower handle includes a cup sized to receive a halved citrus fruit, such as a lemon or lime. The upper handle includes a male die which mates with said cup to compress and thus juice the halved fruit. To save material and weight, the male die is formed as relatively constant thickness, which results in a depression on the opposite, outer side of the upper handle. of the body has a collar extending therefrom and surrounding the blade. This collar is sized to be received within the depression formed in the upper handle of the citrus press. The collar may be sized and formed such that the zester may be selectively mounted to the press.

BRIEF DESCRIPTION OF THE DRAWINGS

The objects and features of the invention noted above are explained in more detail with reference to the drawings, in which like reference numerals denote like elements, and in which:

FIG. 1 is a top rear perspective view of the combined citrus press and zester in the combined configuration;

FIG. 2 is a side view thereof;

DETAILED DESCRIPTION OF THE INVENTION

Figure 3:
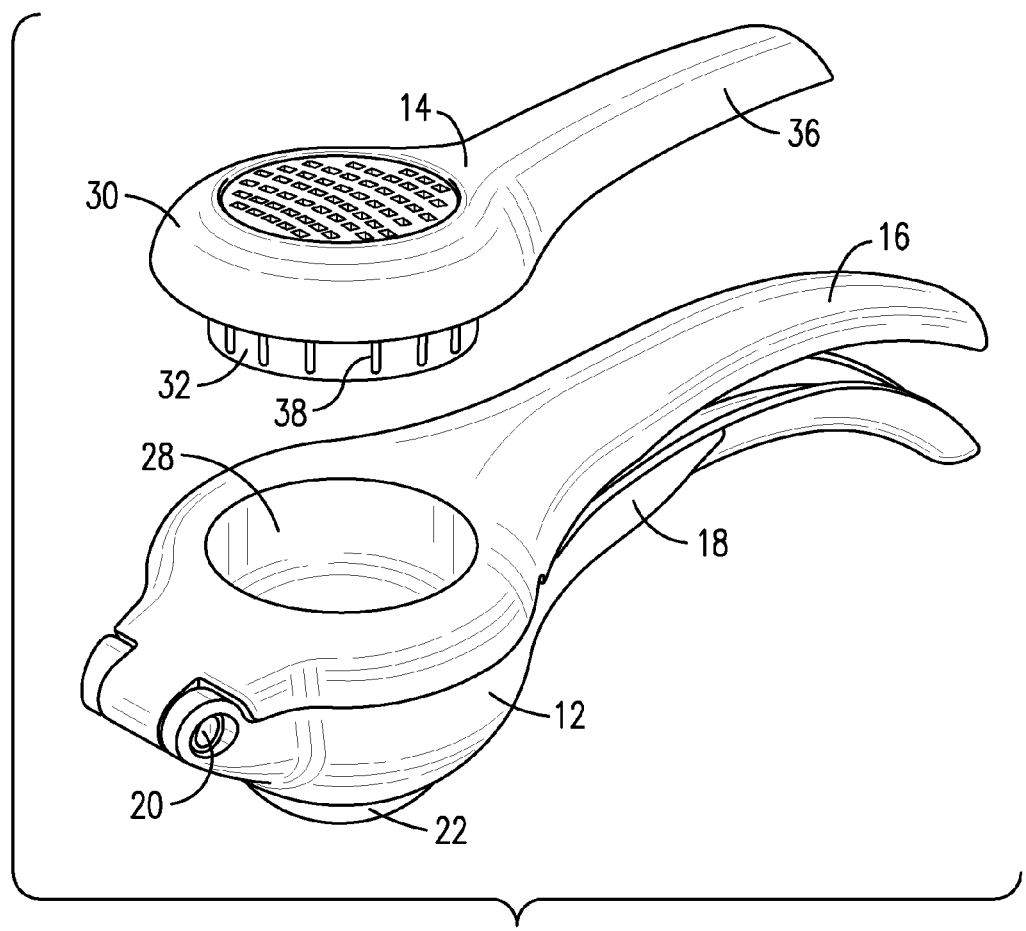
FIG. 3 is a top front perspective view of the press and zester in the separated configuration.

With reference to FIG. 1, a combined citrus press and zester according to the present invention is generally designated by reference numeral 10. The combined press and zester 10 is overall comprised of a citrus press 12, and a citrus zester 14. Each will be described in turn.

The press 12 is of the type commonly known in the art, an example of which is illustrated in U.S. D648,988 to Ablo. The press 12 includes an upper handle 16 and a lower handle 18 joined together at a forward pivot point 20. In the embodiment shown the pivot point is a separate axle, but other arrangements are known in the art.

Figure 4:
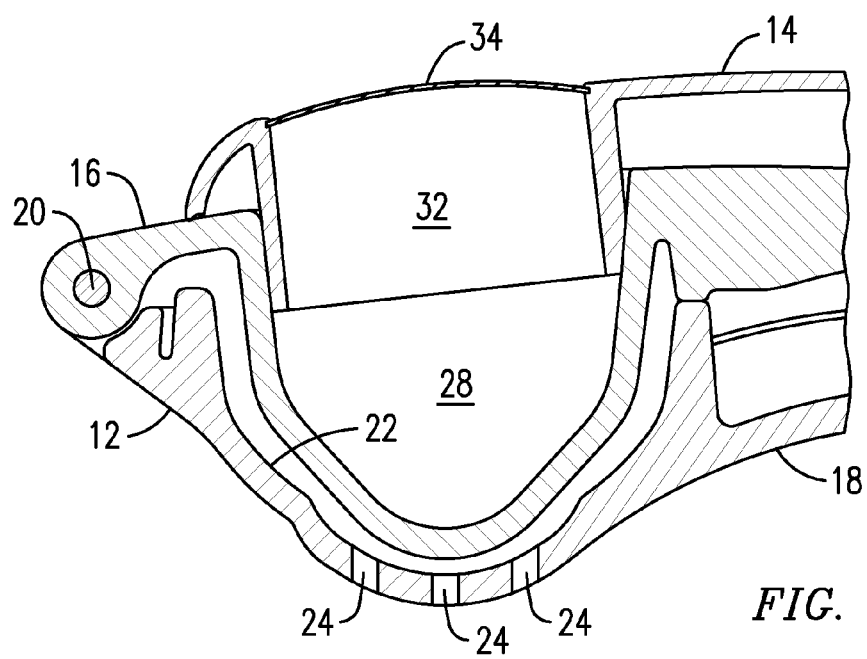
FIG. 4 is a detail side cross-sectional view along line 4-4 of FIG. 1.

As best shown in FIG. 4, the lower handle 18 includes a cup 22 opening towards the upper handle 16. The cup 22 is sized to receive a halved citrus fruit such as a lemon or lime. The cup further includes a number of drain apertures 24 extending through the lower portion of the cup. The upper handle 16 includes a die 26 protruding downwardly therefrom and positioned to be received within the cup 22 when the handles 16 and 18 are brought together. In operation, the die 26 will press the citrus fruit received within the cup 22, with the resulting citrus juice flowing through the drain apertures 24.

In order to save weight and material, it is common in the art for the upper handle 16 to have a relatively constant diameter in the region of the die, resulting in an upwardly opening depression 28 approximately mimicking the die 26. In prior art devices this depression 28 has served no utilitarian purpose. In the present invention, it does, as will become clear below.

The citrus zester 14 includes a body 30 from which an annular collar 32 extends downward. This collar 32 has a diameter and length to allow the collar to be closely received within the upper portion of the depression 28, as best illustrated in FIG. 4. The body 30 also includes a grater portion 34. The grater portion 34 may be formed integrally with the body 30, but is preferably a separate blade mounted to the body. The grater portion 34 is located within the confines of the collar 32. While not required, it is preferred that the body 30 further includes a zester handle 36 extending laterally outward.

The collar 32 may be sized such that it is received merely closely within the depression 28, meaning that it would prevent the zester 14 from moving laterally with respect to the press 12, but would not hold the zester 14 to the press 12 should the two be inverted. With this arrangement, the use of the zester handle 36 would allow greater stability in the connection by the zester handle 36 being formed to rest upon the upper handle 16 when connected such that the user would manually press the zester handle 36 against the upper handle 16 while normally holding the combined press and zester 10.

It is more preferred however, that the collar 32 have a selective connection to the depression 28 when pressed therein by the user to selectively secure the zester 14 to the press 12. With these arrangements, the zester 14 would retain its connection to the press 12 even when inverted, but could be selectively removed by a user manually. There are a variety of possibilities for this connection.

As a first possibility, the collar 32 is sized for a close frictional fit against the depression 28, and is also formed of a plastic resin to allow slight elasticity for an improved connection. As a second possibility, FIG. 3 shows the outer face of this same plastic collar 32 may have a series of vertical ribs to form the engagement against the depression 28. This is preferred to accommodate dimensional variations in the depression 28.

Figure 5:
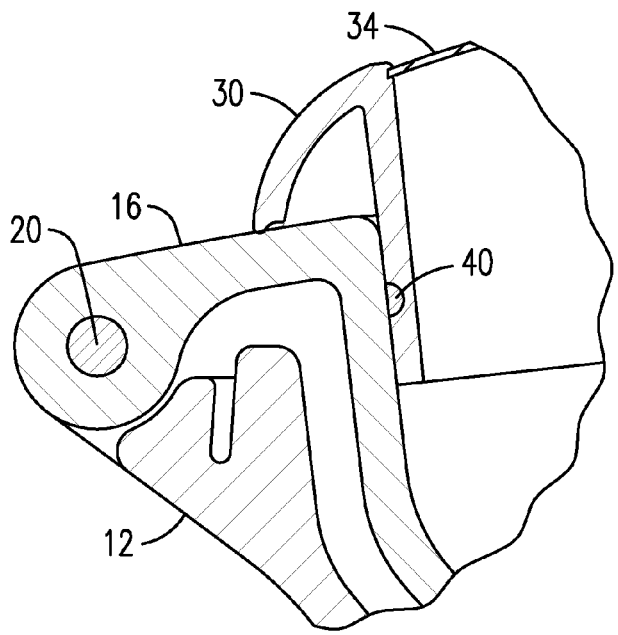
FIGS. 5-7 are detail side cross-sectional views similar to FIG. 4 showing alternative connecting arrangements.
Figure 6:
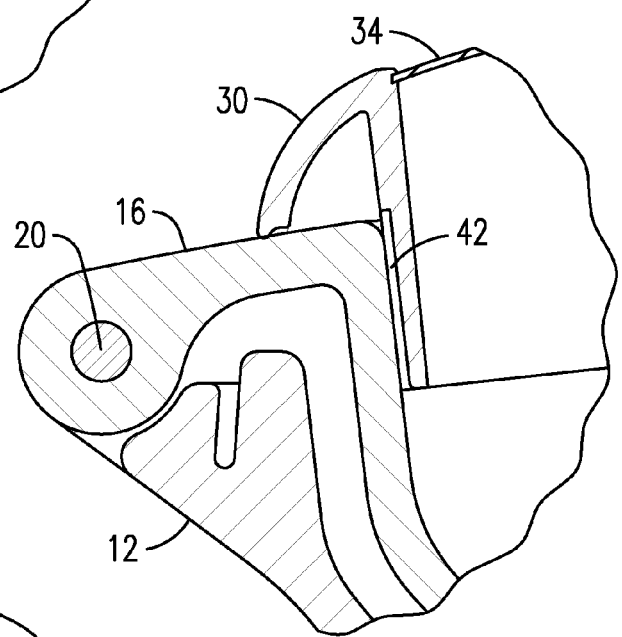

A third possibility is illustrated in FIG. 5, where the collar 32 has a close fit, but includes a circumferential depression receiving a silicone (or similar rubber or elastomer) O-ring 40 to closely engage the depression 28. A fourth possibility is shown in FIG. 6, where at least a portion of the outer face of collar 32 has been overmolded with a ring 42 of an elastomer.

Figure 7:
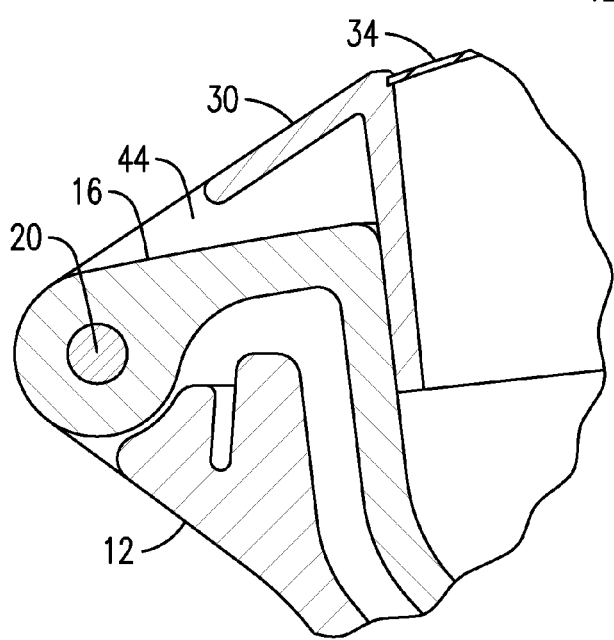

A fifth possibility is shown in FIG. 7, and is of a different character. Here, the body 30 includes a pivot extension 44 having an articulate connection with the pivot point 20. It is preferred that this connection resist free movement, but instead require user manipulation. This will again achieve the desired effect of securing the zester 14 to the press 12 while inverted. Yet a further possibility (not illustrated) would be to embed magnets within the collar 32 (assuming the press 12 was formed of a magnetic material).

There are many other possibilities to achieve this selective connection. Each of the arrangements described herein, and also those not specifically described, are intended to be encompassed by the term "means for selectively securing said zester to said press".

In use, the zester 14 may be used individually as a normal zester, separate and unconnected to the press 12. However, it is also possible for the user to employ the zester 14 while it is positioned on the press 12. When so employed, the user will rub the citrus or other desired object against the grater portion 34 and the resulting grated citrus peel (or "zest") will fall inward to be received and collected within the depression 28. Upon grating the desired amount of peel, the user may then selectively remove the zester 14 from the press 12 to access the zest for use. In this way, two related yet previously unconnected kitchen implements may be combined such that the zester 14 employs the previously unused depression 28 in a practical way.

From the foregoing it will be seen that this invention is one well adapted to attain all ends and objects set forth above together with the other advantages which are inherent within its structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth of shown in the accompanying drawings is to be interpreted as illustrative, and not in a limiting sense.

What is claimed is:

1. In combination, a citrus press and zester:
  said citrus press comprising:
    upper and lower handles connected at a forward pivot point;
    said lower handle including a cup, with said cup having at least one drain aperture extending therethrough;
    said upper handle including a die sized and located to be received within said cup as said handles are moved together, and an upwardly opening depression formed opposite said die; and
  said citrus zester comprising:
    a body;
    a collar extending downward from said body, said collar being sized to be closely received within said depression, and being selectively received therein; and
    a grater portion within the periphery of said collar.

2. The combination of claim 1, wherein said citrus zester further includes a handle extending laterally from said body and shaped to be closely received upon said upper handle when said collar is selectively received within said depression.

3. The combination of claim 1, further including means for selectively securing said zester to said press.

4. The combination of claim 3, wherein said means comprises a friction fit between said collar and said depression.

5. The combination of claim 4, wherein said means further includes an O-ring secured about the outer periphery of said collar.

6. The combination of claim 4, wherein said means further includes an elastomer overmolded on the exterior of said collar.

* * * * *